United States Patent [19]

McElwaine

[11] 4,203,656
[45] May 20, 1980

[54] FEED SHUTTLE MECHANISM FOR MOTION PICTURE FILM STRIPS

[75] Inventor: David C. McElwaine, Millis, Mass.

[73] Assignee: Polaroid Corporation, Cambridge, Mass.

[21] Appl. No.: 941,762

[22] Filed: Sep. 13, 1978

[51] Int. Cl.² .............................................. G03B 1/22
[52] U.S. Cl. ...................................... 352/194; 226/62
[58] Field of Search .................. 352/191, 194; 226/62, 226/67, 70

[56] References Cited

U.S. PATENT DOCUMENTS

| | | | |
|---|---|---|---|
| 2,733,633 | 2/1956 | Wottring | 352/194 |
| 3,410,639 | 11/1968 | Chandler | 352/194 |

Primary Examiner—Monroe H. Hayes
Attorney, Agent, or Firm—Frederick A. Goettel, Jr.

[57] ABSTRACT

A film strip feed shuttle mechanism is provided in which a film engaging claw is supported laterally of an elongated body member adapted to be driven by camming surfaces for both longitudinal reciprocation and oscillatory rotation with respect to an axis established by means for supporting the body member. The shuttle is supported by tension springs retaining the member against the supporting means. The camming surface effecting the longitudinal reciprocation of the shuttle and its mating cam follower surface are positioned with respect to the axis and the laterally supported film engaging claw so that the frictional force developed as a result of the interaction between the cam and cam follower effect an induced torque encouraging rotation of the body member and the claw carried thereby about the axis in a direction causing the claw to move into engagement with the film strip.

2 Claims, 7 Drawing Figures

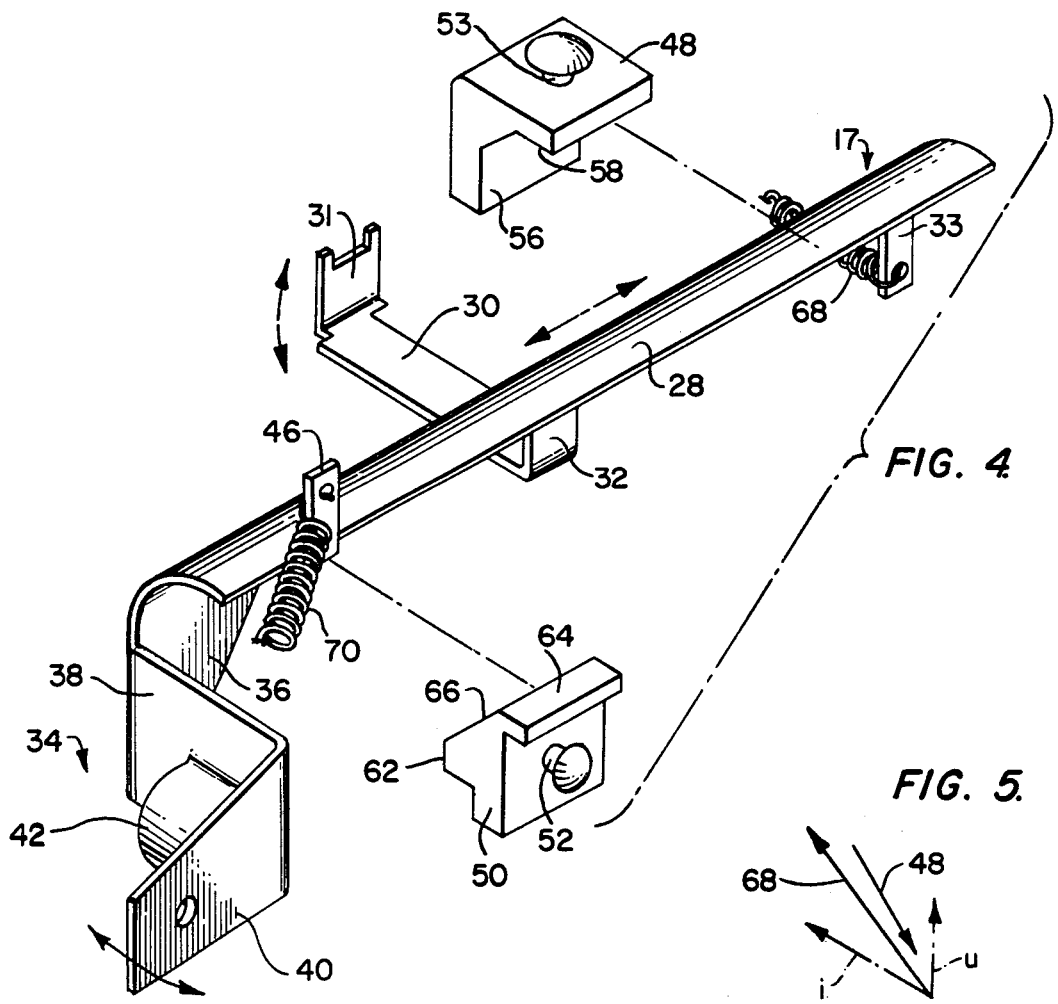
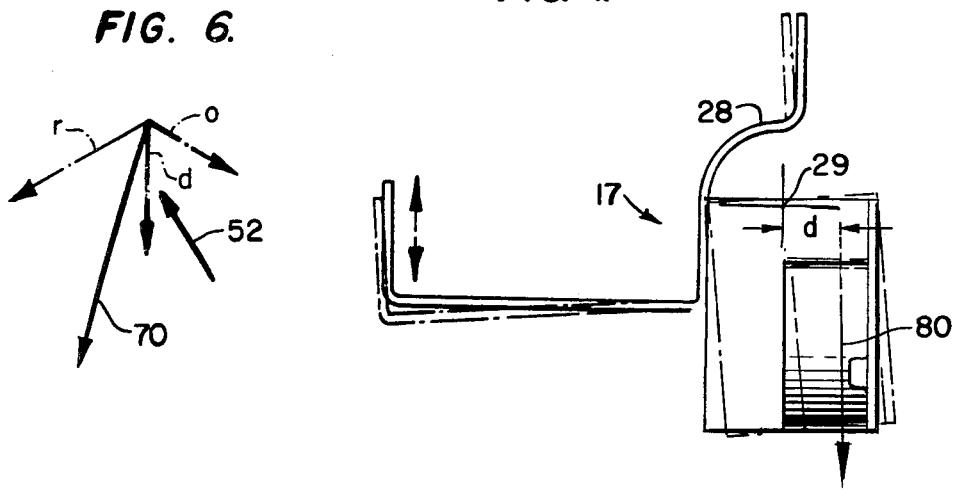

FEED SHUTTLE MECHANISM FOR MOTION PICTURE FILM STRIPS

BACKGROUND OF THE INVENTION

This invention relates to motion picture film projection and, more particularly, it concerns an improved feed shuttle mechanism for incrementally advancing a film strip to present successive image frames thereon to a framing window or the like for the projection of light through the film to an optical system for viewing.

The projection for viewing of motion picture film strips requires that each successive image frame on the film strip be presented in a momentarily still position in registry with a framing aperture through which light is transmitted to present the image on a screen or the like. For this reason, the film is provided with a series of equally spaced feed apertures along at least one marginal edge to be engaged by a feed shuttle claw capable of movement normal to the film strip to engage the spaced apertures, parallel to the plane of the strip to advance the strip in an increment of distance equal to the length of one frame, withdraw from the apertures and return for successive feed cycles. Because of the speeds at which such a shuttle is operated, the compound nature of the feed shuttle claw movement, together with the requirements for precision and synchronization with other projector components, the feed shuttle represents perhaps the most sophisticated mechanical organization in a motion picture projector. As a result, numerous feed shuttle designs have evolved out of the continuing effort to simplify feed shuttle mechanisms while retaining or improving upon the operational characteristics thereof.

One such feed shuttle mechanism is shown and described in copending U.S. application Ser. No. 756,330, now abandoned, which is assigned to the assignee of the present application. In the above-cited application, a film engaging claw of a shuttle is supported in lateral cantilevered fashion centrally along the length of an elongated, transversely arcuate body member adapted to be driven by a single compound cam for both reciprocation in a longitudinal direction parallel to the direction of the film strip advance and rotationally such that the laterally extending claw undergoes the appropriate vertical movement for engaging entry and disengaging withdrawal of successive film strip feed apertures. The shuttle is exclusively supported by a pair of longitudinally spaced springs adapted to retain the arcuate body against quadrant bearing blocks located at opposite ends of the body in the vicinity of the springs as well as against the surfaces of the actuating cam. The lateral extension of the claw portion contributes not only to the required compound movement of the shuttle, but also enables the shuttle to be mounted along the exterior structure adapted to receive a cassette in which the film strip is contained.

SUMMARY OF THE INVENTION

In accordance with the present invention, the peripheral cam of the compound cam of the above-described shuttle arrangement and its cam follower carried by the shuttle itself have been configured so that their engagement interface is positioned at a location offset from the theoretical axis of rotation of the shuttle. The frictional force developed between the cam and its follower during operation of the shuttle thus acts through a moment arm to cause an induced torque which serves to assist rotation of the shuttle in a direction encouraging the claw to re-engage the film perforations. Such an arrangement is particularly advantageous in that it reduces the reliance on the springs, permits smaller springs and, accordingly, results in less wear, less heat and less noise in the feed shuttle mechanism.

BRIEF DESCRIPTION OF THE DRAWINGS

FIG. 4 is an exploded perspective view of the feed shuttle of the invention;

FIG. 5 is a force vector diagram depicting the spring support on one end of the feed shuttle;

FIG. 6 is a similar force vector diagram illustrating the orientation of a spring support on the other end of the feed shuttle; and FIG. 7 is an end view of the feed shuttle depicting a force vector representing the frictional force developed between the peripheral cam and its follower and its position with respect to the theoretical rotational axis of the feed shuttle mechanism.

DETAILED DESCRIPTION OF THE PREFERRED EMBODIMENT

Figure 1:
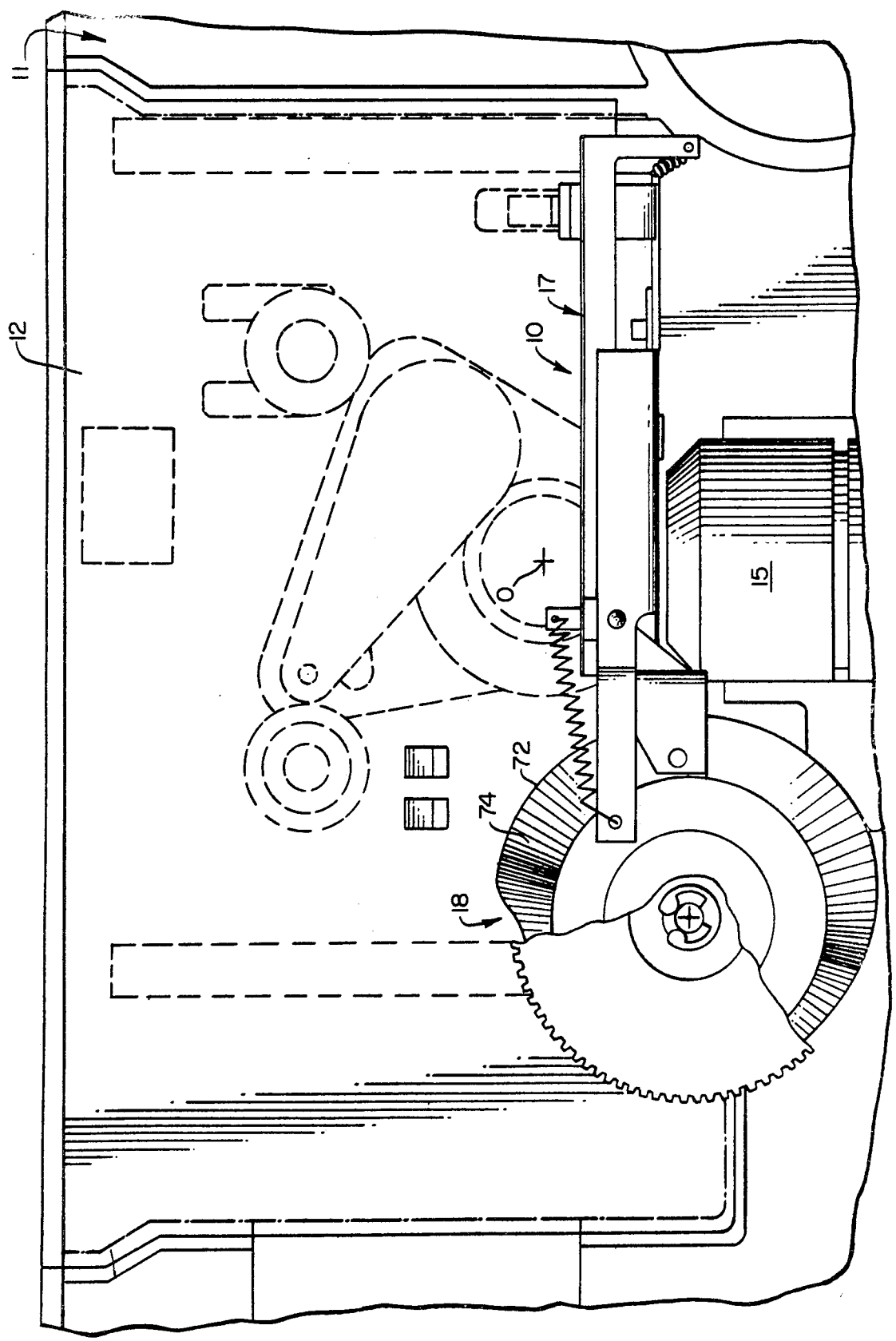
FIG. 1 is a fragmentary side elevation illustrating the feed shuttle of the invention incorporated in a viewing apparatus adapted to receive cassette-contained film strips.
Figure 2:
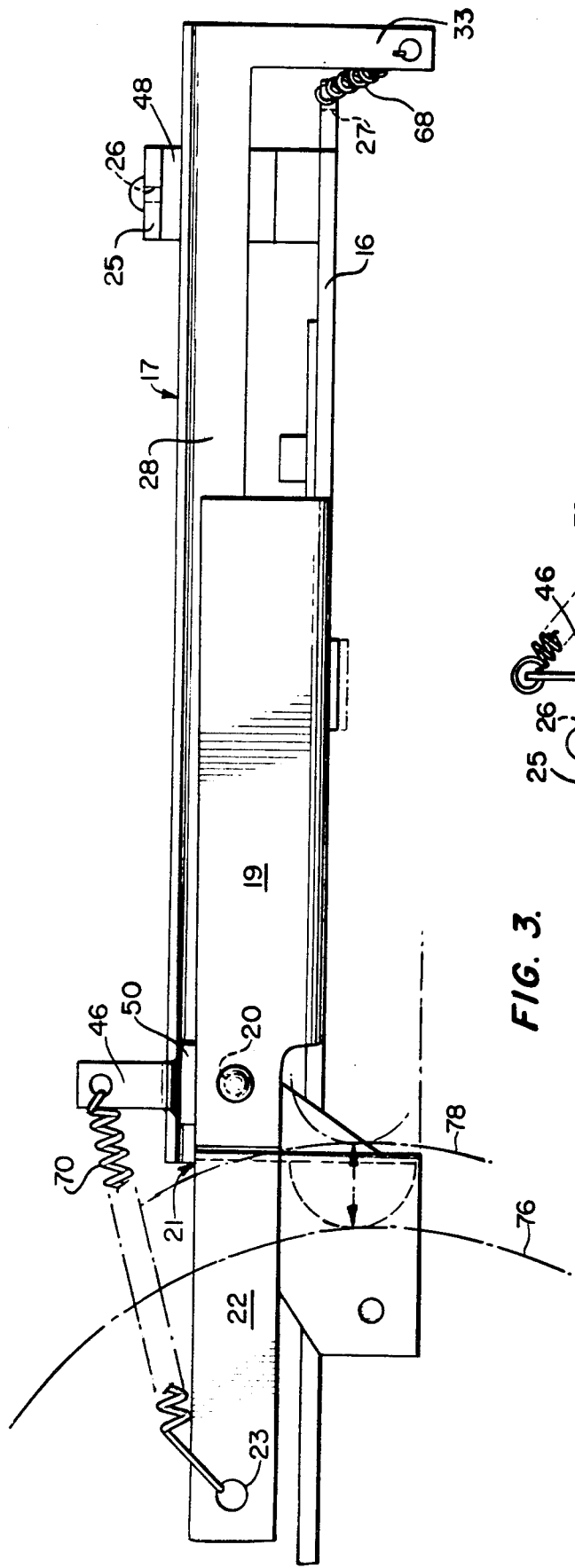
FIG. 2 is an enlarged side elevation of the feed shuttle and supporting structure.
Figure 3:
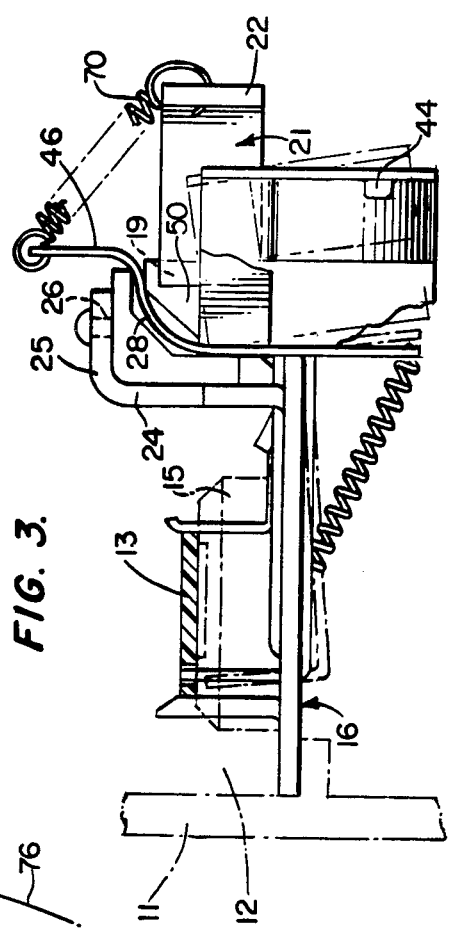
FIG. 3 is an end view of the organization illustrated in FIG. 2.

In FIGS. 1-3 of the drawings, the film strip feed shuttle mechanism of the present invention is generally designated by the reference numeral 10 and shown in an operative position relative to interior components of a motion picture viewing or projection apparatus in which the mechanism is particularly, though not exlusively, adapted for use. Since a detailed description of viewing apparatus components is unnecessary for a full understanding of the feed shuttle mechanism 10 to which the invention is related, such components are only generally shown to include a chassis wall 11 defining a film cassette well 12 arranged so that projection light directed on an axis 0 will pass through a cassette contained motion picture film strip 13 and downwardly through a lens 14 to be projected as motion picture images. Although the film strip 13 to be projected in the viewing apparatus is preferably contained within a cassette (not shown) it will suffice for purposes of the present invention to note that the film strip will be positioned by the cassette and cassette well 12 to overlie an aperture block 15 supported by a stamped metal foundation plate 16 defining the floor of the cassette well 12. Also for purposes of directional reference, it may be assumed that the film strip 13 will be fed incrementally in a forward direction proceeding from left to right in the context of FIG. 1. Also, the terms "front" and "rear" will be used hereinafter in the description of various feed shuttle structure and operation, it being understood that front corresponds to the forward direction of film strip feed whereas rear implies the opposite direction.

The mechanism 10 includes as a single moving component, a feed shuttle element 17 adapted to be driven by a rotatable cam 18 relative to fixed viewing apparatus or, more specifically, cassette well carried components providing the needed support for the shuttle 17. In this context, the foundation plate 16 is shaped to include a vertical flange 19 having an aperture 20 therein and joining at its rear end with an L-shaped portion 21 to establish a laterally displaced, rearwardly extending supporting tab 22 having an aperture 23 formed therein. At the front right corner of the foundation plate, an inverted L-shaped bracket formation 24 is provided to establish the laterally projecting horizontal supporting tab 25 having an aperture 26 therein. An aperture 27 is located near the front end of the plate 16 to be exposed on the external underside of the cassette well 12. It will be noted further in FIGS. 2 and 3 that the flange 19 projects laterally beyond the bracket 24 and terminates at a front end spaced longitudinally from the bracket 24.

As shown most clearly in FIGS. 4 and 7, the shuttle 17 is formed with an elongated body portion 28 having an arcuate cross-section extending through a quadrant of a circle concentric with the longitudinal axis 29 of the shuttle. An arm 30 supporting a claw 31 is integral with the body through a depending flanged leg 32 joining as a tangent with the lower edge of the transversely arcuate body 28. A depending tab 33 extends similarly in tangential fashion from the lower edge of the body 28 at the front end thereof. The rear end of the body is provided with a cam follower bracket 34 formed as a double bent extension of a depending tangential web 36. The bracket 34 includes a normal flange 38 joining with an axial flange or tab 40. The normal flange 38 supports a peripheral cam follower 42 in a position to underlie the body 28. A radial cam follower bump 44 is formed in the tab 40 on the side thereof adjacent the peripheral cam follower 42 and under the axis 29. An aperture spring tab 46 is struck upwardly from the upper edge of the transversely arcuate body portion 28.

The shuttle 17 is supported for both reciprocable and rotational motion on the axis 29 and with respect to the foundation plate 16 by a pair of longitudinally spaced, inner and outer bearing blocks 48 and 50, respectively. The blocks are molded from low friction material, such as a synthetic resinous material sold under the trademark "Delrin AF" and are shaped for attachment to the foundation plate 16 by projecting post formations 52 and 53 adapted to extend through the apertures 20 and 26, respectively, in the flange 19 and tab 25. After insertion through the apertures, the post formations are deformed ultrasonically to provide the headed formations shown.

The front or inner bearing block 48 is formed with a pair of perpendicular bearing surfaces 56 and 58 to engage and cradle the convex surface of the arcuate shuttle body 28. The outer or rear bearing block 50 is provided with external bearing surfaces 62 and 64 joined by a chamfered surface 66 to engage the inner concave arcuate surface of the body 28.

To retain the shuttle 17 against the respective bearing blocks 48 and 50, a pair of tension springs 68 and 70 are employed. As will be seen in FIGS. 2–6, the spring 68 at the front of the shuttle extends from an aperture near the bottom of the depending tab 33 back to the aperture 27 in the front of the foundation plate 16 (FIG. 2). The axis of tension spring 68 is therefore essentially inwardly toward the block 48 and upwardly against the bearing surfaces 56 and 58. In the vector diagram of FIG. 5, the spring 68 and block 48 are represented by solid line arrows, whereas the force vector components acting on the tab 33 are represented by arrows i and u.

The spring 70 extends between the upstanding tab 46 on the shuttle body 28 rearwardly, outwardly and downwardly to the tab 22 formed on the foundation plate 16. The spring 70, therefore, not only biases the rear end of the shuttle body against the respective bearing surfaces of the outer bearing block 50 but also, exerts a major force component rearwardly to retain the cam follower 42 against a peripheral cam surface 72 on the shuttle drive cam 18. The force components acting on the tab 46 are represented in FIG. 6 by the arrows d, o and r.

The drive cam 18, as shown in FIG. 1, is formed with both a peripheral camming surface 72 and a radial cam surface 74 for engagement respectively with the peripheral cam follower 42 and the radial cam follower or bump 44 formed in the follower bracket 34 at the rear end of the shuttle body 28. The bump 44 will be biased against the radial cam surface 74 as a result of both tension in the spring 68 at the forward end of the shuttle body and the outer component of force o acting about the fixed bearing block 50 at the rear end of the shuttle body. This latter biasing force will be appreciated by reference particularly to FIG. 3 of the drawings wherein the pivot moment about the block 50 exerted by the spring 70 will be seen to urge the button 44 to the left or in a direction against the radial cam surface 74.

Accordingly, it should be appreciated that the cam faces 72 and 74 of the compound cam 18 are configured to cooperate with their respective cam followers 42 and 44 in a manner resulting in engagement of the feed shuttle claw 31 with the perforated film strip 13 and subsequent advancement of the feed shuttle along its longitudinal axis to advance the film strip and to further rotate the claw 31 out of engagement with the film strip whereupon the feed shuttle assembly 17 returns to its initial position for another such cycle. The position of the feed shuttle 17 at the extreme limits of its rotational motion about the axis 29, i.e., into and out of engagement with the film strip 13 is illustrated in both FIGS. 3 and 7. Similarly, the position of the feed shuttle 17 at the extreme limits of its axial motion along the axis 29 is illustrated in FIG. 2 with reference to the phantom line showings, 76 and 78, of the peripheral camming surface 72. During such operation, the rotational direction of the compound cam 18 is in a clockwise direction as viewed in FIG. 1.

With the above-described interrelationships in mind, reference is now made to FIG. 7, where the forces developed as a result of the interaction between the camming surfaces 72 and 74 of the compound cam 18 and the cam follower surfaces 42 and 44 of the feed shuttle are illustrated. Looking at the force developed between the peripheral cam 72 and its follower surface 42, it will be appreciated that during operation, the interraction of these components develop a downward force acting upon the cam follower surface 42 which is represented in FIG. 4 by the force vector 80. The force vector 80 illustrated in FIG. 7 of course represents the effective location of the force developed along the entire width of the interface between the peripheral cam follower 42 and the camming surface 72. Looking now at this effective force vector with respect to the longitudinal axis 29 about which the shuttle rotates during normal operation, it will be appreciated that the force represented by the force vector 80, will act through a moment arm "d" to, in effect encourage clockwise rotation of the entire shuttle mechanism 17 about the longitudinal axis 29. The location of the peripheral cam follower 42 and the peripheral camming surface 72 has been carefully located as illustrated herein to provide such a result.

Referring still to FIG. 7, it will be seen then that the induced torque described above which encourages clockwise rotation of the shuttle mechanism 17 also results in encouraging upward movement of the arm 30 and the shuttle claw 31 carried at its outward end. Such movement of the claw, it has been found, is extremely desirable in that it assists in positively engaging the claw 31 with the perforations in the film strip to assure smooth, positive operation of the overall shuttle mechanism. Accordingly, it should be appreciated that according to the present invention, a frictional force, developed at a cam/cam follower interface, is taken advantage of to obtain a desirable effect which contributes to the overall smooth, efficient operation of the feed shuttle mechanism. It should be further appreciated that the interface between the peripheral cam 42 and its follower 72 may be conveniently located at virtually any location to the right of the axis 29 as viewed in FIG. 7. Any location displaced laterally of the axis by a desired distance "d", in the two radial quadrants on the opposite side of the axis 29 from the claw 31, will result in the desired effect.

It is to be noted that the material from which the bearing blocks 48 and 50 is formed, "Delrin AF", is a moldable material internally lubricated with teflon. The cam 18 is preferably molded from a polycarbonate resin internally lubricated with approximately 2% silicone and 13% teflon. The use of such materials facilitates the formation of the entire feed shuttle 17, including the cam follower formations 42 and 44, as a single or integral metal stamping. Moreover, the precision machining required in the manufacture of the shuttle is reduced to the formation of the feed claw 31, and perhaps limiting burnishing of the portions of the arcuate body portion 28 which engaged the bearing blocks 48 and 50.

Thus, it will be appreciated that as a result of the present invention, an extremely simple yet highly effective motion picture film strip feed shuttle mechanism is provided and by which the above-mentioned objectives are completely fulfilled. Also, it will be apparent to those skilled in the art that modifications may be made in the embodiment described herein and illustrated in the accompanying drawings without departure from the inventive concepts manifested by the disclosed embodiment. Accordingly, it is expressly intended that the foregoing description and illustration in the accompanying drawings is exemplary of a prefered embodiment only, not limiting, and that the true spirit and scope of the present invention be determined by reference to the appended claims.

What is claimed is:

1. A mechanism for incrementally advancing a film strip having uniformly spaced apertures along the length thereof, said mechanism comprising:
   a shuttle;
   means for supporting said shuttle with respect to a longitudinal axis extending parallel to the direction of film advancement, said supporting means permitting rotational movement and longitudinal movement of said shuttle with respect to said axis;
   a film aperture engaging claw supported by said body member laterally of said axis for movement with said body member relative to said axis;
   means for reciprocating said body member with respect to said axis through repeated cycles, each cycle including advance and retract strokes, and for rotating said body member about said longitudinal axis to move said claw to a film aperture engaging position during said advance stroke and to a retracted disengaged position during said retract stroke, wherein said reciprocating and rotating means comprises a first cam follower carried by said shuttle and a first camming surface engaging said first cam follower and effecting said rotation of said body member about said longitudinal axis, and a second cam follower extending substantially parallel to said longitudinal axis and carried by said shuttle at a location laterally displaced from said axis and further located in one of the two radial quadrants with respect to said axis on the opposite side of said axis from said film engaging claw, and a second camming surface, engaging said second cam follower, and effecting said reciprocation of said body member upon rotation of said second camming surface about a rotational axis, the movement of said second camming surface in contact with said second cam follower during rotation thereof being in a direction opposite to the movement of said film engaging claw when said claw is moving into engagement with said film strip apertures, whereby the frictional forces developed as a result of the engagement of said second cam follower and said second camming surface is reacted through said shuttle to encourage rotation of said shuttle and said claw carried thereby about said axis to ensure positive engagement of said claw with said film strip perforations.

2. A mechanism for incrementally advancing a film strip having uniformly spaced apertures along the length thereof, said mechanism comprising:
   an elongated body member having a longitudinal axis;
   a film aperture engaging claw supported by said body member laterally of said axis for movement with said body member relative to said axis;
   means for supporting said elongated body member with said longitudinal axis parallel to the direction of film feed including bearing means for engaging said elongated member at two support locations spaced at opposite axial ends of said elongated body member and in opposite radial quadrants concentric with said axis, and spring means for yieldably retaining said body member into engagement with each of said support locations whereby said body member is restrained against radial movement with respect to said longitudinal axis;
   means for reciprocating said body member with respect to said axis through repeated cycles, each cycle including advance and retract strokes and for rotating said body member about said longitudinal axis to move said claw to a film aperture engaging position during said advance stroke and to a retracted disengaged position during said retract stroke, wherein said reciprocating and rotating means comprises peripheral and radial cam follower surfaces formed on said body member and a drive cam having a pair of camming surfaces respectively engaged with said cam follower surfaces, said camming surface engaging said peripheral cam follower surface effecting said reciprocation of said body member and said cam surface engaging said radial cam follower surface effecting said rotation of said body member about said longitudinal axis, the surface of contact between said peripheral cam follower surface and its engaging cam surface being located laterally of said axis on the opposite side of said axis from the lateral position of said aperture engaging claw such that the frictional forces developed as a result of the engagement of said peripheral cam follower surface and its mating camming surface is reacted through said body member to encourage rotation of said elongated body and said claw supported by said body about said longitudinal axis in a direction to insure positive engagement of said claw with said film strip perforations.

* * * * *